(12) United States Patent
Xi (10) Patent No.: US 11,830,219 B2
(45) Date of Patent: Nov. 28, 2023

(54) JOINT VISUAL LOCALIZATION AND ORIENTATION DETECTION METHOD

(71) Applicant: Midea Group Co., Ltd., Foshan (CN)

(72) Inventor: Wei Xi, San Jose, CA (US)

(73) Assignee: MIDEA GROUP CO., LTD., Foshan (CN)

(*) Notice: Subject to any disclaimer, the term of this patent is extended or adjusted under 35 U.S.C. 154(b) by 0 days.

(21) Appl. No.: 17/565,178

(22) Filed: Dec. 29, 2021

(65) Prior Publication Data

US 2023/0206490 A1 Jun. 29, 2023

(51) Int. Cl.
*G06T 7/73* (2017.01)
*G06T 1/00* (2006.01)
*G01S 5/02* (2010.01)
*H04N 23/695* (2023.01)

(52) U.S. Cl.
CPC ............ *G06T 7/74* (2017.01); *G01S 5/02585* (2020.05); *G06T 1/0014* (2013.01); *H04N 23/695* (2023.01); *G06T 2207/20081* (2013.01); *G06T 2207/30204* (2013.01); *G06T 2207/30244* (2013.01)

(58) Field of Classification Search
CPC ......... G05D 2201/0207; G05D 1/0246; G05D 1/0231
See application file for complete search history.

(56) References Cited

U.S. PATENT DOCUMENTS

| 5,525,883 A | 6/1996 | Avitzour | |
|---|---|---|---|
| 2005/0253870 A1* | 11/2005 | Kotake | G06T 7/73 345/633 |
| 2007/0271011 A1* | 11/2007 | Lee | G05D 1/028 901/1 |

(Continued)

FOREIGN PATENT DOCUMENTS

| CN | 109099915 A | 12/2018 |
|---|---|---|
| WO | WO 2020000737 A1 | 1/2020 |

OTHER PUBLICATIONS

Ababsa FE, Mallem M. Robust camera pose estimation using 2d fiducials tracking for real-time augmented reality systems. InProceedings of the 2004 ACM SIGGRAPH international conference on Virtual Reality continuum and its applications in industry Jun. 16, 2004 (pp. 431-435). (Year: 2004).*

(Continued)

*Primary Examiner* — Clifford Hilaire
(74) *Attorney, Agent, or Firm* — Morgan, Lewis & Bockius LLP (57) ABSTRACT

The method and system disclosed herein presents a method and system for capturing, by a camera device on a mobile robot moving in an environment, an image frame at a first location within a portion of the environment. In accordance with a determination that the image frame contains a first visual marker: the method includes determining a camera orientation angle from the camera device to a first anchor associated with the first visual marker based on the image frame; detecting, by a detector on the mobile robot, a first (Continued)

beacon signal emitted by the first anchor. The method includes determining a distance between the mobile robot and the first anchor; and determining an orientation angle of the mobile robot based on the camera orientation angle, and the distance between the mobile robot and the first anchor.

14 Claims, 9 Drawing Sheets

(56) References Cited

U.S. PATENT DOCUMENTS

| | | | |
|---|---|---|---|
| 2008/0262718 A1* | 10/2008 | Farwell | G05D 1/0244 |
| | | | 701/445 |
| 2010/0049402 A1* | 2/2010 | Tanaka | B60R 1/00 |
| | | | 701/41 |
| 2014/0198206 A1 | 7/2014 | Murray | |
| 2015/0205301 A1 | 7/2015 | Gilmore et al. | |
| 2015/0269439 A1 | 9/2015 | Versace et al. | |
| 2017/0031369 A1 | 2/2017 | Liu et al. | |
| 2017/0315558 A1 | 11/2017 | Vojak | |
| 2020/0211203 A1* | 7/2020 | Dincal | G06T 7/248 |
| 2023/0033466 A1* | 2/2023 | More | G06T 7/55 |

OTHER PUBLICATIONS

Midea Group Co., Ltd., ISRWO, PCT/IB2022/061950, Mar. 8, 2023, 9 pgs.

\* cited by examiner

602 Capture, by a camera device on a mobile robot moving in an environment, an image frame at a first location within a portion of the environment In accordance with a determination that the image frame contains a first visual marker:
604 determine, a camera orientation angle from the camera device to a first anchor associated with the first visual marker based on the image frame 606 Detect, by a detector on the mobile robot, a first beacon signal emitted by the first anchor 608 Determine a distance between the mobile robot and the first anchor 610 Determine an orientation angle of the mobile robot based on the camera orientation angle, and the distance between the mobile robot and the first anchor

JOINT VISUAL LOCALIZATION AND ORIENTATION DETECTION METHOD

FIELD OF THE TECHNOLOGY

The present disclosure generally relates to the technology of detecting an orientation of a mobile robot.

BACKGROUND OF THE TECHNOLOGY

Methods that build a map of an environment allow the mobile robot to map out unknown environments and localize itself in the environment to carry out tasks such as path planning and obstacle avoidance.

Localization, place recognition, and gaining an understanding of an environment are key capabilities to enable a mobile robot to become a fully autonomous or semi-autonomous system in the environment. Ultra-wideband (UWB) technology attracts much attention for its short range localization capabilities due to its robustness with respect to multipath and non-line of sight effects.

SUMMARY

An UWB localization system includes at least three (e.g., three, or four, or more) reference stations which are referred as UWB anchors. In UWB localization systems, UWB anchors are placed at predetermined positions. A robot that has UWB capabilities is able to exchange information with the various UWB anchors and calculate its distances to the at least three anchors by measuring time of flight of signals to each of the at least three anchors. The signals allow the robot to determine its own position.

Trilateration is a position estimation method that determines a position of an object using distances of the object to at least three known points (e.g., anchors). Position estimation methods are able to estimate the position of an object (e.g., a robot), but not the orientation of the object. Thus, there is a need for methods and systems that allow an orientation of an object to be determined, in addition to its position.

The methods and systems describe herein include adding one or more visual markers (e.g., visual landmarks) on a reference anchor station. By using a camera mounted on a robot to detect the visual marker associated with the reference anchor station, an orientation angle of the robot can be recovered.

According to a first aspect of the present application, a method includes: capturing, by a camera device on a mobile robot moving in an environment, an image frame at a first location within a portion of the environment. In accordance with a determination that the image frame contains a first visual marker: the method includes determining a camera orientation angle from the camera device to a first anchor associated with the first visual marker based on the image frame; detecting, by a detector on the mobile robot, a first beacon signal emitted by the first anchor. The method includes determining a distance between the mobile robot and the first anchor; and determining an orientation angle of the mobile robot based on the camera orientation angle, and the distance between the mobile robot and the first anchor.

In some embodiments, the method includes rotating the mobile robot at the first location so that the camera device captures a second image frame that includes the first visual marker in accordance with a determination that the image frame does not contain the first visual marker. In some embodiments, the method includes providing the first visual marker to the first anchor prior to capturing the image frame at the first location; and determining the camera orientation angle based on the image frame, in accordance with a determination that one or more characteristics of the first beacon signal matches a predefined pattern. In some embodiments, the first beacon signal is an ultra-wideband signal in a radio-frequency spectrum. In some embodiments, the method includes optimizing the determined orientation angle of the mobile robot iteratively using a learning gain. In some embodiments, the image frame includes a second visual marker, the method further includes optimizing the orientation angle of the mobile robot by minimizing a reprojection error associated with the first visual marker and the second visual marker. In some embodiments, the camera orientation angle from the camera device to the first anchor is obtained in camera coordinates and the orientation angle of the mobile robot is determined in world coordinates.

According to a second aspect of the present application, an electronic device includes one or more processors, memory and a plurality of programs stored in the memory. The programs include instructions, which when executed by the one or more processors, cause the electronic device to perform the methods described herein.

According to a third aspect of the present application, a non-transitory computer readable storage medium stores a plurality of programs for execution by an electronic apparatus having one or more processors. The programs include instructions, which when executed by the one or more processors, cause the electronic device to perform the methods described herein.

In addition to reducing computation complexity, and improving speed and accuracy of mapping and localization of mobile robots in an environment, as described above, various additional advantages of the disclosed technical solutions are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1A:
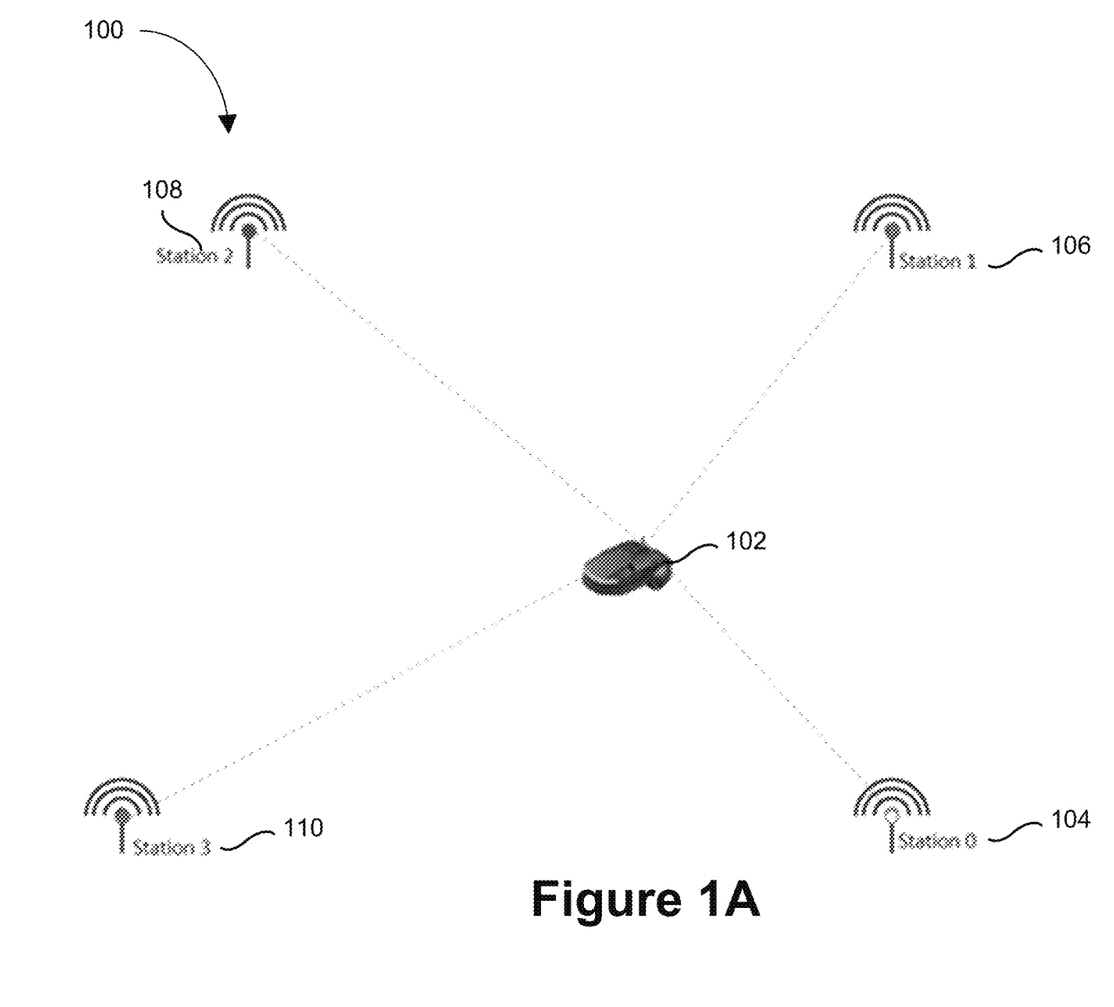
FIG. 1A shows a localization system in accordance with some embodiments.

FIG. 1A shows a localization system in accordance with some embodiments. A localization system includes at least three stationary beacons located at known positions. In some embodiments, a localization system 100 includes four stationary beacons—a first beacon 104, a second beacon 106, a third beacon 108, and a fourth beacon 110, each of which is positioned at a known location. In general, the system can include N number of beacons preinstalled at fixed locations $P_{w_1}, \ldots, P_{w_i}, \ldots, P_{w_N}$, respectively. The subscript "w" denotes that the positions of each beacon is in the world coordinate frame. The stationary beacons positioned around a region (e.g., a region traversed by a mobile robot 102) are referred to as anchors. In some embodiments, providing an additional anchor (e.g., the fourth stationary beacon) beyond the minimal three anchors improves accuracy of the localization through redundancy (e.g., localization can still be carried out if one of the four anchors malfunctions). A beacon is also placed on a mobile robot 102. The beacon on the mobile robot 102 can also be referred to as the tag. Multiple tags can be used in the localization system 100. The mobile robot 102 estimates its position at $P_{w_r}$ using an appropriate localization method, such as trilateration or graph localization, etc. The position of the mobile robot 102 is determined in the world coordinate frame (e.g., the subscript "w" denotes world coordinate frame) based on the world coordinate frame measurements of the locations of the three stationary beacons. Trilateration involves determining a position of an object based on distances of the object from three known points. Here, trilateration is used to determine a position of the mobile robot 102 with respect to three stationary beacons—the locations of each of the three stationary beacons are already known (e.g., the beacons are placed and fixed at known locations), and the tag on the mobile robot is able to detect its distance to each of the three stationary beacons based on the time taken by the signals from each of the three stationary beacons to reach the tag. In some embodiments, to avoid interference, a time-hopping (TH) code is used for determining the accurate position of a signal in a dedicated time frame to decrease the chance of interference between UWB systems. The UWB tag on mobile robot initiates range measurements by sending a poll message with the known address of each anchor. The range signals are aggregated and sent back via UWB or other wireless communication method.

In some embodiments, the beacons (e.g., stationary beacons and the mobile beacon on the mobile robot) are ultra-wideband (UWB) beacons. UWB beacons include sensors and emitters that communicate with one another over the ultra-wide band radio spectrum. In some embodiments, the UWB radio spectrum is between 3 to 15 GHz (e.g., between 3.1-10.6 GHz), and the UWB beacon has a large bandwidth of more than 300 MHz (e.g., about 500 MHz).

A signal is sent from a first beacon and received by a second beacon different from the first beacon. Given the time between sending the signal and receiving the signal, a distance between the first and second beacons can be estimated with an accuracy of better than 1 meter (e.g., better than 75 cm, better than 50 cm, better than 25 cm, better than 15 cm, about 10 cm, about 5 cm).

Traditional UWB localization systems are able to determine a spatial location of the mobile robot 102, but not an orientation angle of the mobile robot 102. The methods and systems described herein relate to a joint visual and sensor detection of an orientation of the mobile robot. In some embodiments, the sensor detection includes the use of UWB sensors.

Figure 1B:
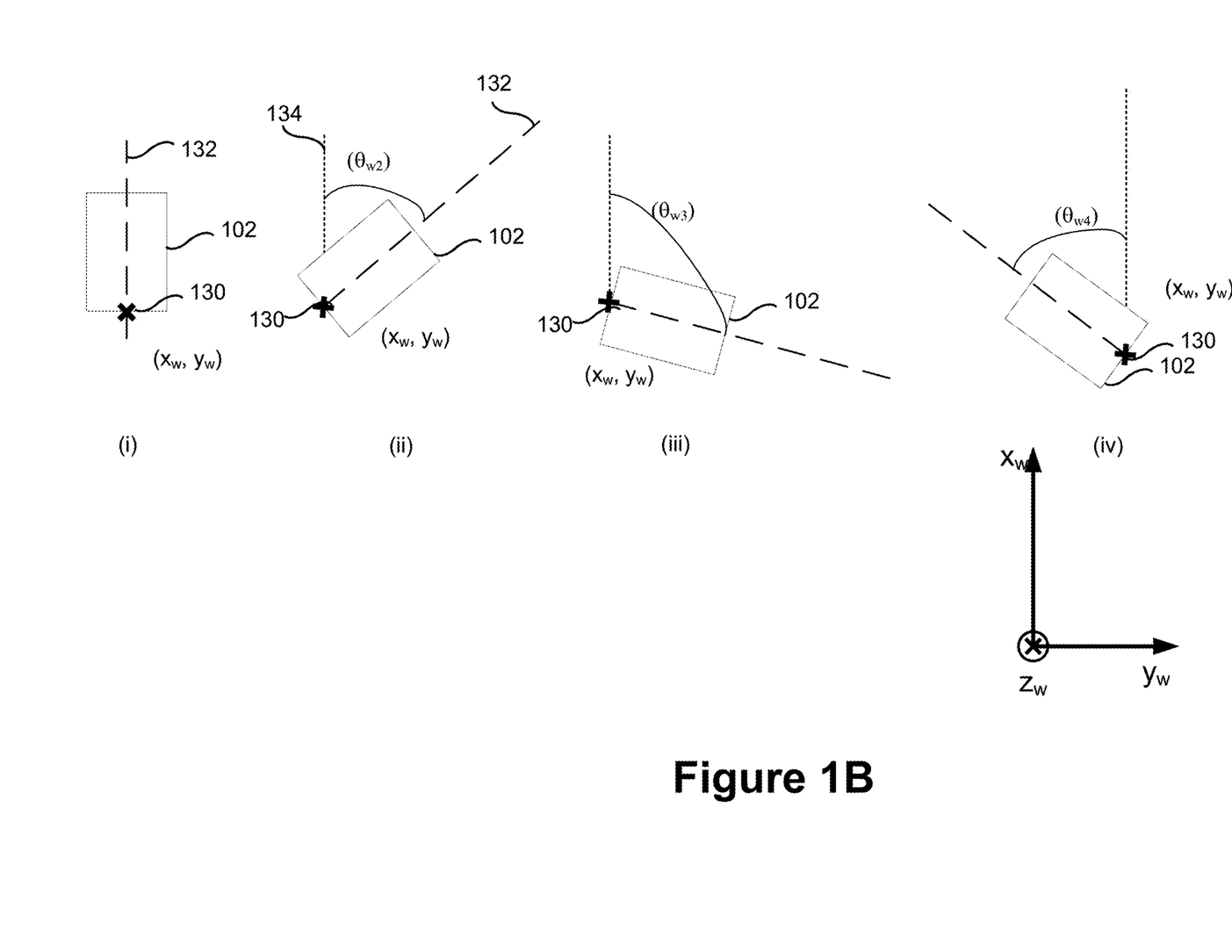
FIG. 1B illustrates a mobile robot at different orientation angles, in accordance with some embodiments.

FIG. 1B illustrates a mobile robot at different orientation angles, in accordance with some embodiments. All four orientations shown in FIG. 1B are provided in a top-down view (e.g., in the x-y plane, where z is a height dimension). The mobile robot 102 in all four orientations are located at the same point ($x_w$, $y_w$). The coordinates are shown in the world coordinate frame. In some embodiments, a sensor 130 is located at a rear end of the mobile robot 102, as shown in FIG. 1B. In some embodiments, the point ($x_w$, $y_w$) refers to a central point of the sensor 130. In some embodiments, the point ($x_w$, $y_w$) refers to a central point of the mobile robot 102.

The first orientation shown in FIG. 1B (i), has the mobile robot 102 generally facing forward. For example, a central axis 132 of the mobile robot 102 is generally parallel to the $x_w$ axis. In the second orientation, the central axis 132 of the mobile robot 102 is oriented at an angle $\theta_{w2}$ with respect to a central axis 134 that is parallel to the $x_w$ axis. In the third orientation, the central axis 132 of the mobile robot 102 is oriented at an angle $\theta_{w3}$ with respect to a central axis 134, and $\theta_{w3}$ is larger than $\theta_{w2}$. In the fourth orientation, the central axis 132 of the mobile robot 102 is oriented at an angle $\theta_{w4}$ with respect to a central axis 134, and $\theta_{w4}$ is an orientation angle measured counterclockwise with respect to the central axis 134, in contrast to the orientation angle $\theta_{w2}$, which is measured clockwise with respect to the central axis 134. All four orientations show the mobile robot 102 at the same location ($x_w$, $y_w$).

Figure 2A:
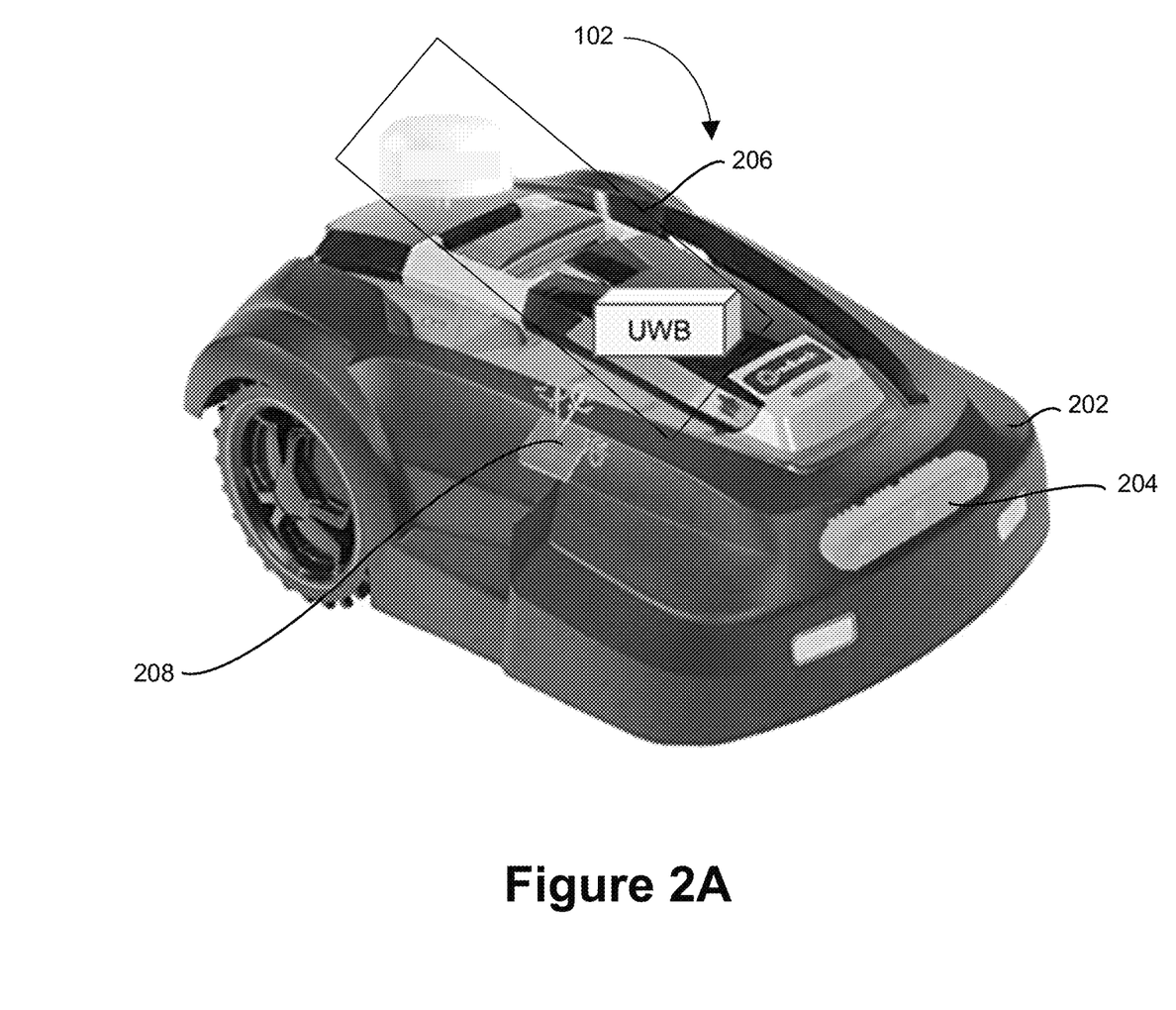
FIG. 2A show an example robot, in accordance with some embodiments.

FIG. 2A show an example robot, in accordance with some embodiments. A mobile robot 102 includes a chassis 202, an RGB camera 204, a localization module 206, and IMU sensors 208. In some embodiments, the localization module 206 includes an ultra-wideband (UWB) module and a regular GPS module. In some embodiments, other precise localization solutions such as real-time kinematic GPS (RTK-GPS) are used. The mobile robot 102 also includes a computational device (e.g., processors etc.) and a persistent storage (e.g., nonvolatile storage). A RGB camera is mounted at the front of robot to detect surrounding objects. In some embodiments, an appropriate collision avoidance and/or local replanning algorithm are applied to navigate the robot 102 safely on the ground.

Figure 2B:
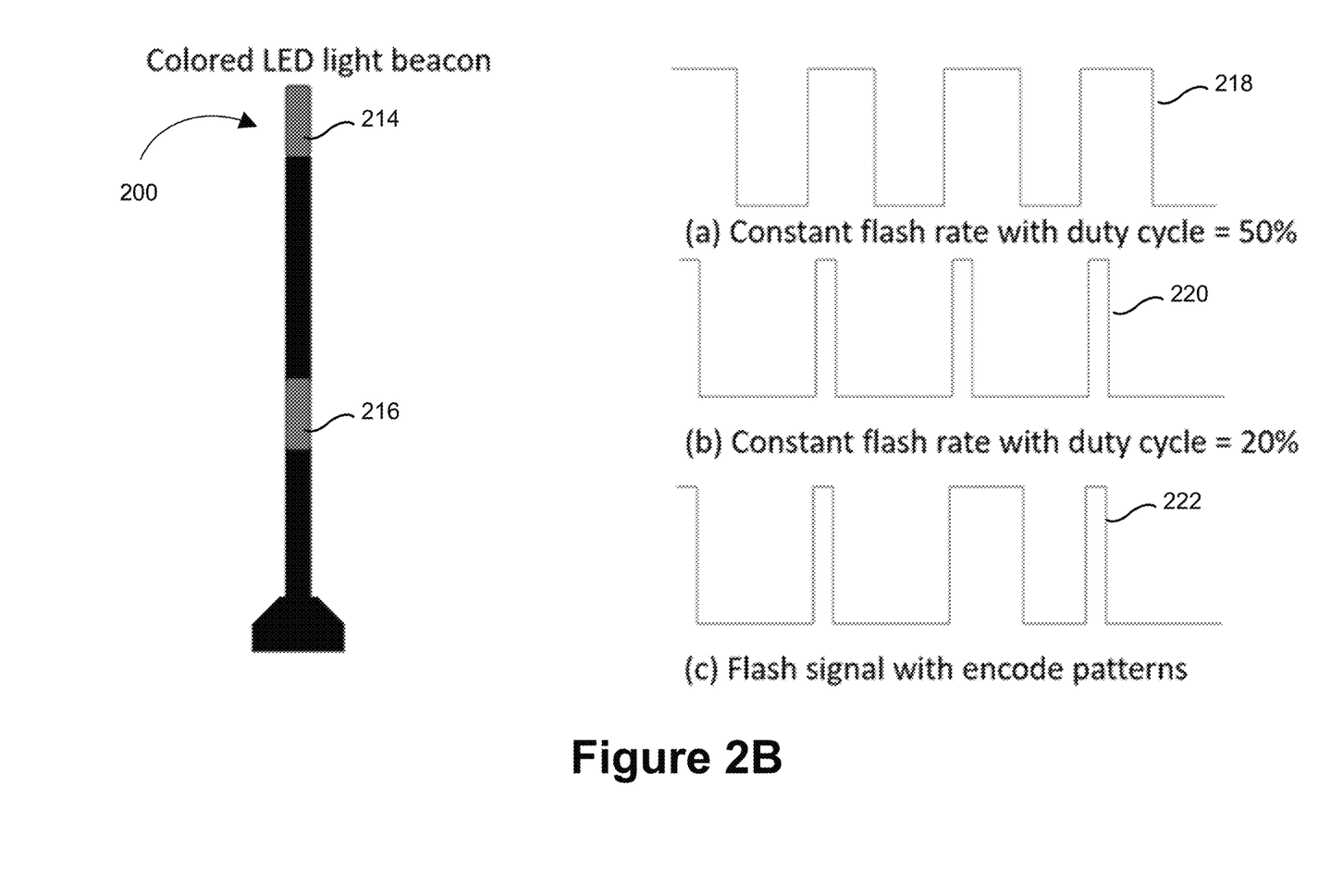
FIG. 2B shows an example beacon, in accordance with some embodiments.

FIG. 2B shows an example beacon, in accordance with some embodiments. In some embodiments, beacons 104, 106, 108 and 110 shown in FIG. 1A each includes a RGB LED light emitter (e.g., the LED light is installed/mounted on the beacon) installed thereon. In some embodiments, passive visual fiducials are alternatively or additionally installed on the beacons. Examples of passive visual fiducials include highly reflective visual markers. In some embodiments, each beacon has a unique color-coded light beacon. In some embodiments, the beacons are programmed to flash at different duty cycles and/or rates, or flash at special designed (e.g., predetermined) timing intervals. In some embodiments, additional LED colors and/or LED that emits flashing patterns are used to more quickly and uniquely identify each beacon, and/or enhance the visual detection of the beacons.

A UWB anchor 200 shown in FIG. 2B includes more than one LED emitters. A first LED emitter 214 is positioned higher on the UWB anchor 200 compared to a second LED emitter 216. In some embodiments, depending on a field of view of a camera on the mobile robot 102, providing the second LED emitter 216 allows the mobile robot 102 to capture light emitted from the second LED emitter 216 in an image frame when the mobile robot 102 is closer to the UWB anchor 200 (e.g., when the mobile robot is too close to the UWB anchor to capture light emitted from the first LED emitter 214).

To initialize the mobile robot 102 (e.g., when the mobile robot 102 begins to operate in a region), a vision system of the mobile robot 102 captures an image of the surrounding and attempts to identify a location of an anchor in the camera image. The vision system identifies a location of the anchor by way of the light emitted from a light source installed on the anchor (e.g., colored light emitted from a LED emitter installed on the anchor) or by way of a passive visual fiducial installed on the anchor. Any visual indication of the location of the anchor is hereinafter described as the "visual marker" captured by the vision system. If the vision system fails to locate any visual markers in the image captured by a camera in the vision system, the mobile robot 102 enters a searching mode, and rotates (e.g., at a constant rate) while capturing images of the surroundings. The vision system searches, in each captured image, for visual markers (e.g., light emitted from the LED emitter installed on the anchor. For example, the vision system searches in each captured image for light of a predefined color emitted by the LED emitter installed on a beacon.

Once a candidate visual marker (e.g., one or more pixels having the predefined color emitted by a beacon) is found in a particular image, the mobile robot 102 captures further images while oriented in the same direction. The camera on the mobile robot 102 captures images at a first rate (e.g., at more than 5 Hz, at about 10 Hz, at more than 10 Hz, at about 20 Hz, etc.). The vision system monitors the region in the captured image where the candidate visual marker was found, and the sequence of images permits the vision system to determine a flash rate and/or duty cycle associated with the candidate visual marker.

Based on the camera image capture frame rate, the vision system determines if the sequence of captured images matches a duty cycle of the LED emitter associated with a particular beacon. A signal pattern 218 shows a LED emitter installed on the beacon having a constant flash rate with a duty cycle of 50%. In this case, for example, for a sequence of 10 captured images (e.g., captured in 1 second at an image capture rate of 10 Hz), 5 of the 10 captured images record light emitted from beacon having the signal pattern 218 (e.g., during an "on" portion of the duty cycle), and 5 of the 10 images would capture one or more dark pixels at region in the image associated with the beacon. A signal pattern 220 shows a LED emitter having a constant flash rate with a duty cycle of 20%. A signal pattern 222 shows a LED emitter having a non-constant flash rate that includes an encode pattern.

In accordance with a determination that the detected flash rate and/or duty cycle associated with the candidate visual marker matches a predefined pattern, and that the captured light matches a frequency of light (e.g., predetermined color emitted from a particular LED emitter associated with a beacon), the vision or other visual characteristics associated with the LED emitter installed on a particular beacon, the vision system determines that it has succeeded in visually locating the anchor and stops its rotational search movements. The mobile robot 102 has successfully completed the orientation initialization process.

The vision system then calculates the pixel center of the visual marker. In some embodiments, the pixel center is the central region of a group of pixels that captures the visual marker.

Figure 3:
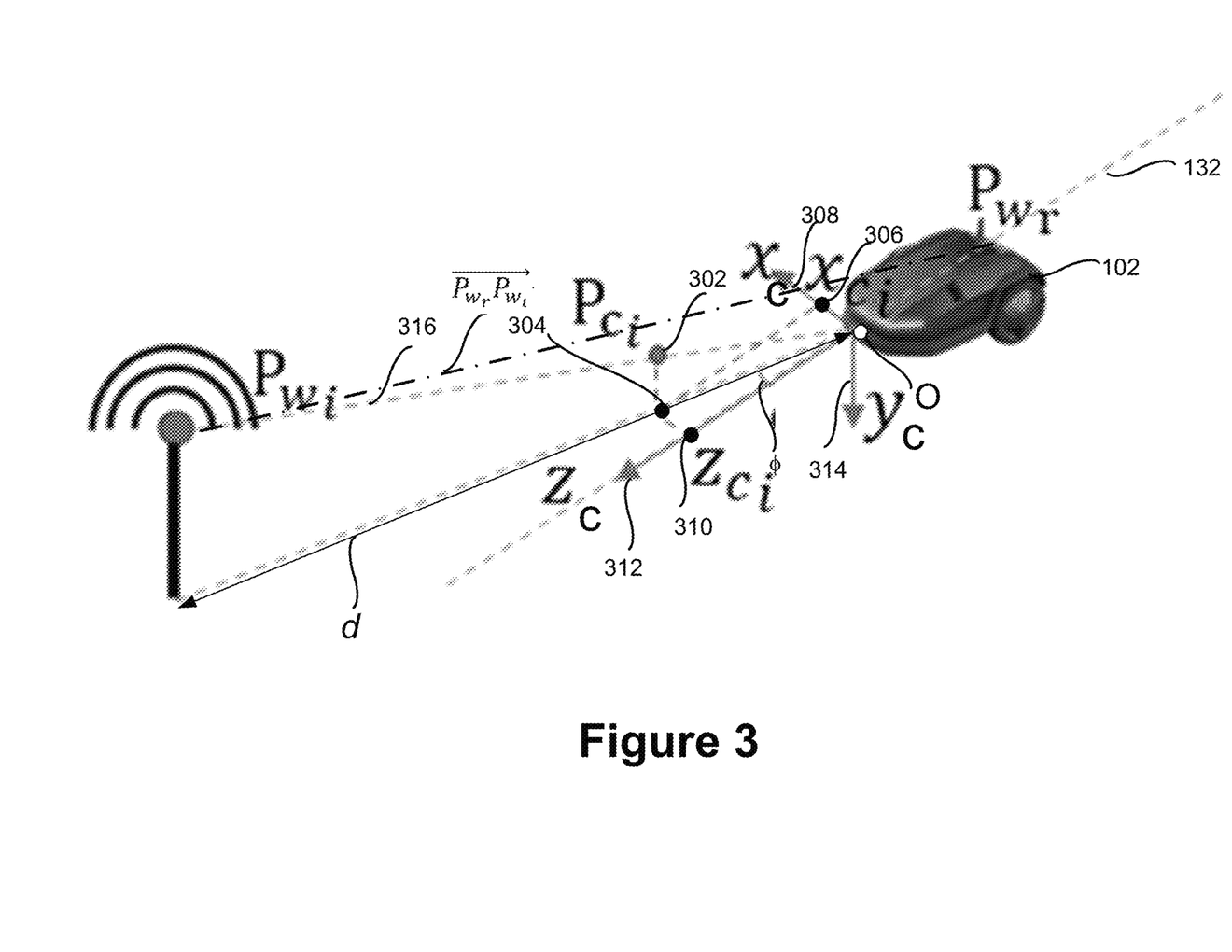
FIG. 3 shows an example visual marker detection method 300, in accordance with some embodiments.

FIG. 3 shows an example visual marker detection method 300, in accordance with some embodiments. The pixel center $P_{c_i}$ 302 is captured at a position $[u_i, v_i]$ where u and v are two orthogonal axes in the plane of the captured image (e.g., $P_{c_i}=[u_i, v_i]$). Using a pre-calibrated intrinsic matrix K, a position of the visual marker (e.g., location of the visual marker is coincident with the anchor location in the world coordinate frame $P_{w_i}$) in the captured image is converted into a projected landmark position in the camera frame using Equation (1) below.

$$\begin{bmatrix} x_{c_i} \\ y_{c_i} \\ z_{c_i} \end{bmatrix} = K^{-1} \begin{bmatrix} u_i \\ v_i \\ 1 \end{bmatrix} \quad (1)$$

$x_{c_i}$, $y_{c_i}$, and $z_{c_i}$ are the coordinates of the projected visual marker in the camera coordinate frame. As shown in FIG. 3, a visual marker associated with the anchor at a world coordinate position $P_{w_i}$ is captured at the center pixel $P_{c_i}$ 302. The center pixel $P_{c_i}$ 302 is projected down onto the ground plane as a point 304. The point 304 is resolved along two orthogonal camera frame axes—the camera frame axis xc 308, and the camera frame axis zc 412—into the x-component $x_{c_i}$ 306, and the z-component $z_{c_i}$ 312. The pre-calibrated intrinsic matrix K receives the pixel position $[u_i, v_i]$ and provides x-component $x_{c_i}$ 306, and the z-component $z_{c_i}$ 312 as the output using the transformation shown in Equation 1. A camera orientation angle $\phi$ is determined using Equation (2):

$$\phi = \arctan \frac{x_{c_i}}{z_{c_i}} \quad (2)$$

Assuming the camera of the mobile robot 102 is located at a position O, as shown in FIG. 3, the vector $\overrightarrow{OP_{w_i}}$ is the vector from the camera center O to the anchor location in the world coordinate frame $P_{w_i}$. The camera orientation angle $\phi$ is the angle made by a projection of the vector $\overrightarrow{OP_{w_i}}$ and the central axis 132 of the mobile robot 102. The camera orientation angle $\phi$ is calculated in the camera frame.

Figure 4:
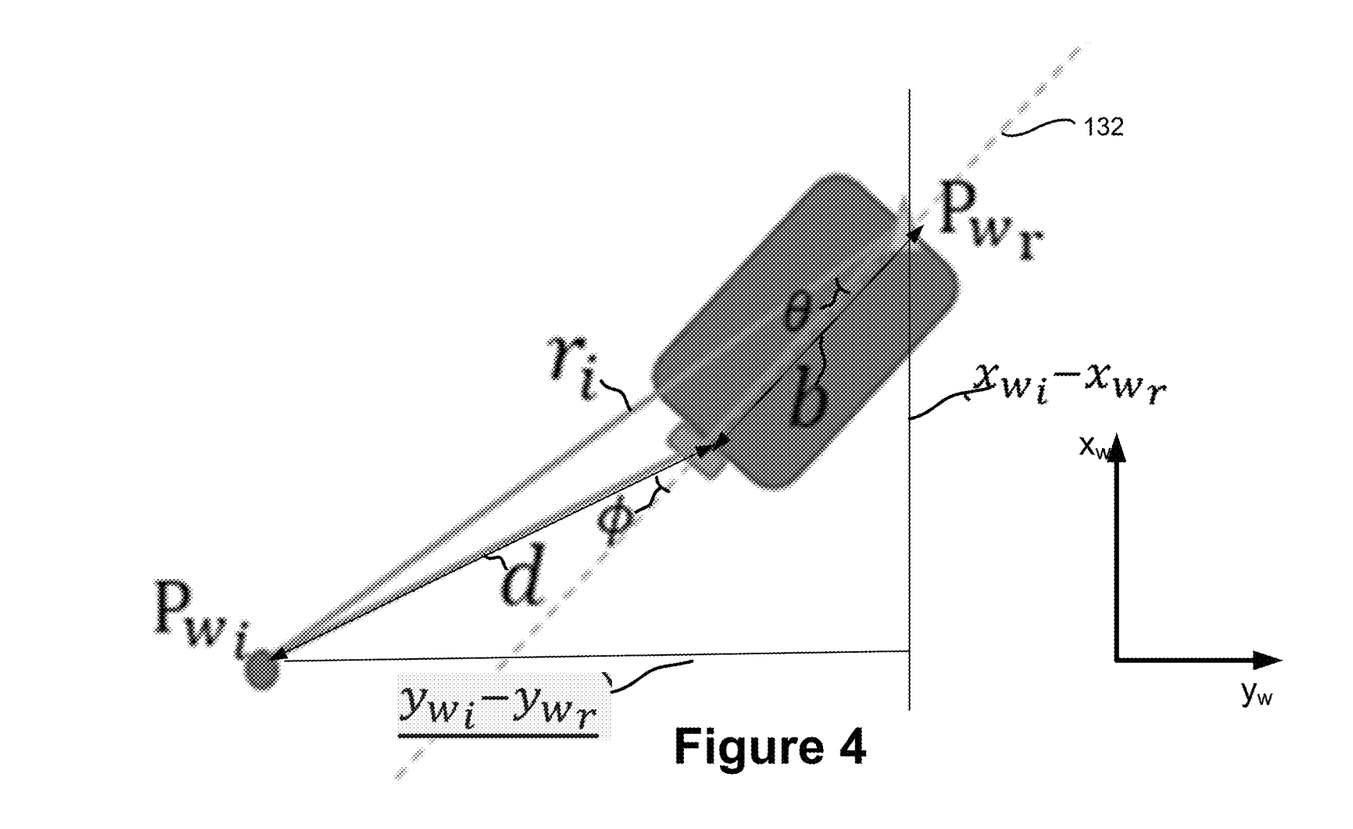
FIG. 4 shows an example orientation determination method, in accordance with some embodiments.

FIG. 4 shows an example orientation determination method, in accordance with some embodiments. In some embodiments, an orientation determination method 400 includes a sensor (e.g., a UWB module) and a camera center O that are not positioned at the same location on the mobile robot 102. In some embodiments, the sensor is a UWB module located at $P_{w_r}$ in the world coordinate system. The camera center O and $P_{w_r}$ are displaced along the central axis 132 of the mobile robot 102 by a distance b. A distance R between the UWB module and beacon is denoted as $R=\|P_{w_i}P_{w_r}\|$ An angle θ denotes a sensor orientation angle between a projection of the vector $\overrightarrow{P_{w_r}P_{w_i}}$ onto the ground plane ($r_i$) and the central axis 132 of the mobile robot 102 is calculated using Equation (3):

$$\theta = \text{sgn}(\phi)\arccos\frac{b\sin^2\phi + \cos\phi\sqrt{r_i^2 - b^2\sin^2\phi}}{r} \quad (3)$$

To illustrate the correspondence between FIG. 3 and FIG. 4, the distance d, which is the distance between the camera center O and a point associated with the beacon position $P_{w_i}$, being projected onto a ground plane. The mobile robot 102 is assumed to be traveling on the ground plane (e.g., the camera center O is on the ground plane). Equation (3) is derived from the following two equations that describe the relationships shown in Figure (4): $b^2+d^2-2bd\cos(\pi-\phi)=r_i^2$ and $b^2+r_i^2-2br_i\cos\theta=d^2$.

$R=\|P_{w_i}P_{w_r}\|$ is the absolute distance of the vector $\overrightarrow{P_{w_r}P_{w_i}}$. Assuming that the anchor positioned at $P_{w_i}$ is at a height of h, $r_i$ denoted in FIG. 4 is calculated using Equation (4):

$$r_i = \sqrt{R^2 - h^2} \quad (4)$$

Equation (4) converts the orientation angle θ from the camera frame into the full orientation angle $\theta_w$ of the mobile robot 102 in the world frame, by combining the orientation angle θ (obtained from camera frame information), and the orientation of $\overrightarrow{P_{w_r}P_{w_i}}$:

$$\theta_w = \theta + \arctan\left(\frac{y_{w_i} - y_{w_r}}{x_{w_i} - x_{w_r}}\right) \quad (5)$$

where $y_{w_i}$ and $y_{w_r}$ are the world coordinates of the anchor, and the UWB module, respectively, along the y axis, and $x_{w_i}$ and $x_{w_r}$ are the world coordinates of the anchor, and the UWB module, respectively, along the x axis.arctan $$\left(\frac{y_{w_i} - y_{w_r}}{x_{w_i} - x_{w_r}}\right)$$

reflects the orientation of $\overrightarrow{P_{w_r}P_{w_i}}$ in world frame, whereas θ reflects orientation of robot relative to $\overrightarrow{P_{w_r}P_{w_i}}$. By summing the two components, the full orientation angle $\theta_w$ is obtained.

At initialization, various variables are set, according to Equation (6):

$$\hat{\theta}_w(0) = \tilde{\theta}_w(0) = \theta_w \quad (6)$$

The full orientation angle $\theta_W$ of the mobile robot 102 in the world frame is set, at initialization (e.g., when t=0) as the value of the estimator $\tilde{\theta}_w(0)$. In general, estimator values are derived from frames captured by the camera in the vision system of the mobile robot 102. The estimator value $\tilde{\theta}_w(0)$ is also set as the predicted value $\hat{\theta}_w(0)$ of the orientation angle of the mobile robot 102, at t=0.

In some embodiments, the mobile robot 102 continually updates its orientational reading by undergoing rotational movement at a rate (e.g., a constant rate) ω, while continuously capturing images that include the visual markers and performing the steps outlined in one or more of Equations (1)-(5). The predicted value $\hat{\theta}_w(t)$ at a time t is based on the estimator value obtained at an earlier time step (t−Δt) (e.g., $\tilde{\theta}_w(t-\Delta t)$) where Δt is the increment in time for each time step, and adding the predicted increase in angular rotation based on the angular rotational speed ω of the mobile robot 102, as expressed in Equation (7):

$$\hat{\theta}_w(t) = \tilde{\theta}_w(t-\Delta t) + \omega \Delta t \quad (7)$$

In some embodiments, the vision system locks the visual marker once it enters the camera's field of view (FOV). In some embodiments, an error in an estimator $\theta_w(t)$ of the orientation of the mobile robot is iteratively corrected using a learning gain λ, according to Equation (8) below:

$$\tilde{\theta}_w(t) = \hat{\theta}_w(t) + \lambda[\theta_w - \hat{\theta}_w(t)] \quad (8)$$

Here, the predicted $\hat{\theta}_w(t)$ at a time t (e.g., obtained from Equation (7) and the value $\theta_w$ at a time t, (e.g., obtained based on one or more image frames captured by the camera in the vision system at time t, and calculated using Equations (1)-(5)) are used. A learning gain λ is multiplied to a difference between $\theta_w$, calculated from images captured, and the predicted $\hat{\theta}_w(t)$ calculated based on a rotational angular speed of the mobile robot 102 (e.g., using Equation (7)). A greater learning gain increases the weight given to correction term (e.g., $\lambda[\theta_w - \hat{\theta}_w(t)]$ calculated based on a difference between $\theta_w$ and $\hat{\theta}_w(t)$. The estimator $\tilde{\theta}_w(t)$ is calculated by adding the correction term to the predicted $\hat{\theta}_w(t)$ at a time t. λ is determined by the confidence level of the vision-based detection method. In some embodiments, λ is between 0.5 to about 0.9.

If visual landmark detection is out of range (e.g., outside the FOV of the camera in the vision system), the predicted $\hat{\theta}_w(t)$ is set as the full orientation $\theta_w$ of the mobile robot 102 at time t (e.g., otherwise $\theta_w$ is not determined absent input from the image frames captured by the camera of the vision system), as shown in Equation (9) below:

$$\theta_w = \hat{\theta}_w(t) \quad (9)$$

If two visual markers are detected in a single image, an ensemble average of each of the two full orientation angles is determined. For example, the first full orientation angle $\theta_w(1)$ at a time t is determined using Equations (1)-(5) based on the first visual marker located in the camera image, as captured by the camera of the mobile robot 102. The second full orientation angle $\theta_w(2)$ at the same time is determined using Equations (1)-(5) based on the second visual marker located in the same camera image, as captured by the camera of the mobile robot 102 at the same location. The ensemble average of the two full orientation angles is determined using Equation 10:

$$\theta_w = (\theta_w(1) + \theta_w(2))/2. \quad (10)$$

Another approach is to optimize the orientation by minimizing a reprojection error, using Equation (11) below, to obtain the optimized orientation angle $\theta_w^*$.

$$\theta_w^* = \text{argmine}_{\theta_w} \Sigma \|P_{w_i} - p_i\| \quad (11)$$

The function $\pi(P_{w_i})$ is a camera projection function of a world point (e.g., $P_{w_i}$, a position of the anchor in the world coordinate frame). In some embodiments, minimizing the camera projection error of the anchor to image frame includes finding a best camera orientation. In some embodiments, the projection function is different for different camera system (e.g., pinhole camera, fisheye camera, etc.). For a pinhole camera, the projection function can be expressed as $h_i = P*P_{w_i}$, where P is a matrix representing the camera projection function. In some embodiments, the reprojection error is a geometric error corresponding to the image distance between a projected point (e.g., $h_i$) and a measured one (e.g., $p_i$). The reprojection error can be used to quantify how closely an estimate of a 3D point recreates the point's true projection.

In some embodiments, Equation (11) is used to minimize the sum of projection error of all visual markers (e.g., associated with different anchors) captured in the image by optimizing the full orientation angle $\theta_w$. In some embodiments, starting with an assumed $\theta_w$, an associated projector function $\pi$ is obtained, and the error between the expected projected point and the actual pixel location in the camera image is determined. Thereafter, $\theta_w$ is updated (e.g., by sweeping through a range of angles) and the error is determined for the updated $\theta_w$, until the value of $\theta_w^*$ is obtained when the error is minimized. In some embodiments, the range of angle used to search for $\theta_w^*$ depends on a confidence level of the orientation angle. For example, if the confidence range of $\theta_w^*$ is ±10°, the range of angle used is ±30°.

Figure 5:
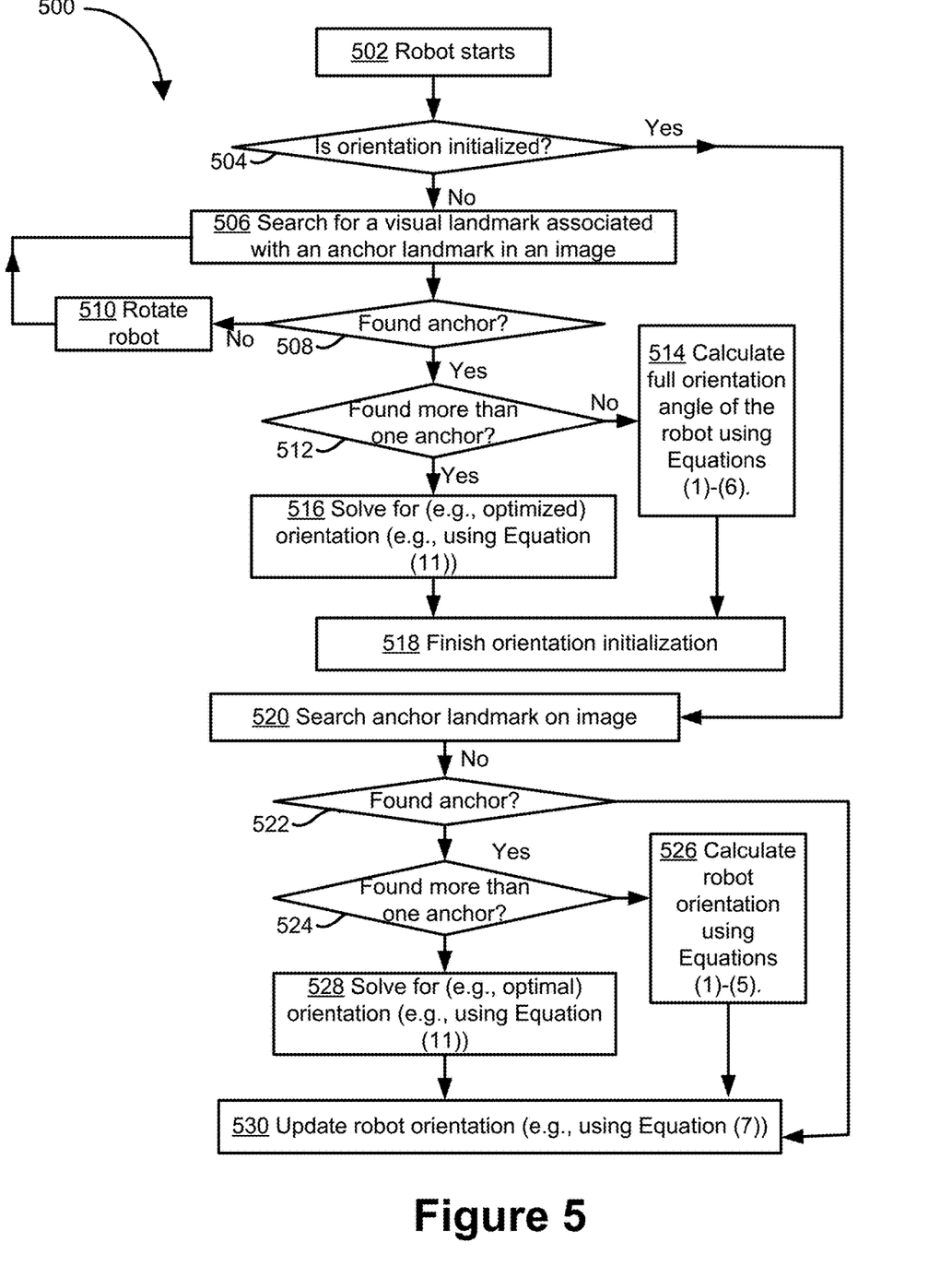
FIG. 5 is an example flowchart for determining an orientation angle of a mobile robot, in accordance with some embodiments.

FIG. 5 is an example flowchart for determining an orientation angle of a mobile robot, in accordance with some embodiments. A process 500 is optionally performed by the onboard processing units of the mobile robot, in accordance with some embodiments. In some embodiments, the process 500 is performed by a server in communication with the mobile robot. In some embodiments, the process 500 is performed jointly by the mobile robot and a server in communication with the mobile robot over a network. For ease of description, the steps of the process 500 are described with respect to a mobile robot, which is non-limiting and may be understood to be performed by the server or jointly by the mobile robot and the server, in accordance with various embodiments.

As the first step, the mobile robot starts (502) operation. The process 500 determines (504) whether an orientation of the robot has been initialized. In accordance with a determination that the orientation of the robot has not been initialized, a camera in a vision system of the robot captures an image of the surrounding, and the vision system of the robot searches (506) for a visual landmark associated with the anchor, in the image. The vision system determines (508) whether a visual mark has been found in the image. In accordance with a determination that a visual marker has not been found, the robot rotates (510) about its current location while capturing image frames of the surrounding (e.g., images captured by the mobile robot are captured while the mobile robot is oriented at different orientation angles), and robot searches (506) for visual landmarks in the newly captured images.

In accordance with a determination that a visual marker has been found, the process 500 further determines (512) if more than one visual marker have been found. In accordance with a determination that only one visual marker has been found, the processor of the robot calculates (514) an orientation angle of the robot using Equations (1)-(6) described above. In accordance with a determination that more than one visual markers have been found, the processor of the robot solves (516) for an optimized orientation angle of the robot (e.g., using Equation (11) to minimize a reprojection error associated with projecting all the visual markers on the captured image frame). The robot finishes (518) the orientation initialization process by using the calculated orientation (from 516 or 514) as the orientation of the robot at time t=0.

In accordance with a determination that the orientation of the robot has been initialized (at the determination in step 504), the vision system of the robot searches (520) for a visual landmark associated with the anchor, in the image. The vision system determines (522) whether a visual marker has been found in the image. In accordance with a determination that a visual marker has not been found, the robot updates (530) its orientation angle, using a current angular rotation speed of the mobile robot (e.g., using Equation (7)). In accordance with a determination that a visual marker has been found, the process 500 further determines (524) if more than one visual marker have been found. In accordance with a determination that only one visual marker has been found, the processor of the robot calculates (526) an orientation angle of the robot using Equations (1)-(6) described above. In accordance with a determination that more than one visual markers have been found, the processor of the robot solves (528) for an optimized orientation angle of the robot (e.g., using Equation (11) to minimize a reprojection error associated with projecting all the visual markers on the captured image frame). The robot updates (530) the orientation angle of the robot for time t.

In some embodiments, the method includes rotating the mobile robot at the first location so that the camera device captures a second image frame that includes the first visual marker in accordance with a determination that the image frame does not contain the first visual marker.

In some embodiments, the method includes providing the first visual marker to the first anchor prior to capturing the image frame at the first location; and determining the camera orientation angle based on the image frame, in accordance with a determination that one or more characteristics of the first beacon signal matches a predefined pattern.

In some embodiments, the first beacon signal is an ultra-wideband signal in a radio-frequency spectrum. In some embodiments, the method includes optimizing the determined orientation angle of the mobile robot iteratively using a learning gain. In some embodiments, the image frame includes a second visual marker, the method further includes optimizing the orientation angle of the mobile robot by minimizing a reprojection error associated with the first visual marker and the second visual marker.

In some embodiments, the camera orientation angle from the camera device to the first anchor is obtained in camera coordinates and the orientation angle of the mobile robot is determined in world coordinates.

In some embodiments, a mobile robot 102 (e.g., an autonomous or semi-autonomous mowing device, cleaning device, delivery device, transportation device, surveillance device, etc.) navigates in the environment (e.g., a lawn in the environment) to perform preprogrammed tasks (e.g., mowing the lawn, vacuuming/mopping the floor, performing security checks, delivering food items or medication, and/or traveling to a charging station or user-selected destination, etc.). In some embodiments, the mobile robot has onboard processing capability to process images, and uses the object semantic information to self-localize in the environment. In some embodiments, the mobile robot includes communication equipment to communication with a host device (e.g., a control station, a home station, a remote server, etc.) to transmit image data to and receive localization results from the host device. In some embodiments, the mobile robot is equipped with both a front view camera (e.g., forward facing) and a top view camera (upward facing) to capture images at different perspectives in the environment. In some embodiments, the mobile robot is further equipped with rear view camera, and/or downward view camera to capture images from different perspectives in the environment. In some embodiments, the mobile robot sends the captured images to an onboard computer (e.g., or a remote computer via wireless connection) to extract object semantic information for localization purpose (e.g., computing the robot or the robot's camera's pose in the environment). In some embodiments, the mobile robot retrieves information needed for localization from a host device, as needed. In some embodiments, some or all of the steps described with respect to the mobile robot can be performed by a host device in communication with the mobile robot. The orientation determination process is discussed in more detail below.

Figure 6:
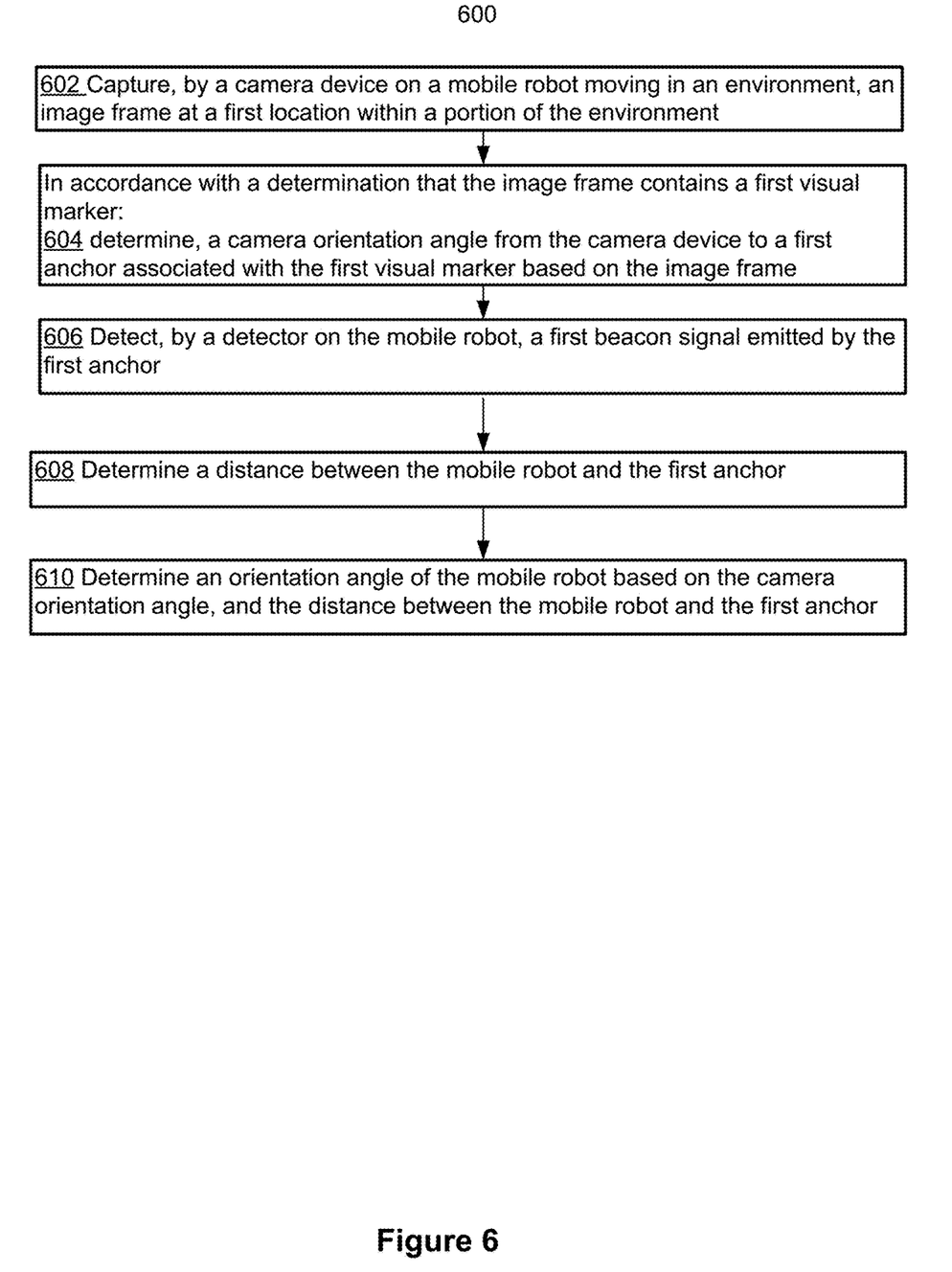
FIG. 6 illustrates an exemplary flowchart for a process of determining an orientation angle of a mobile robot in accordance with some embodiments.
Figure 7:
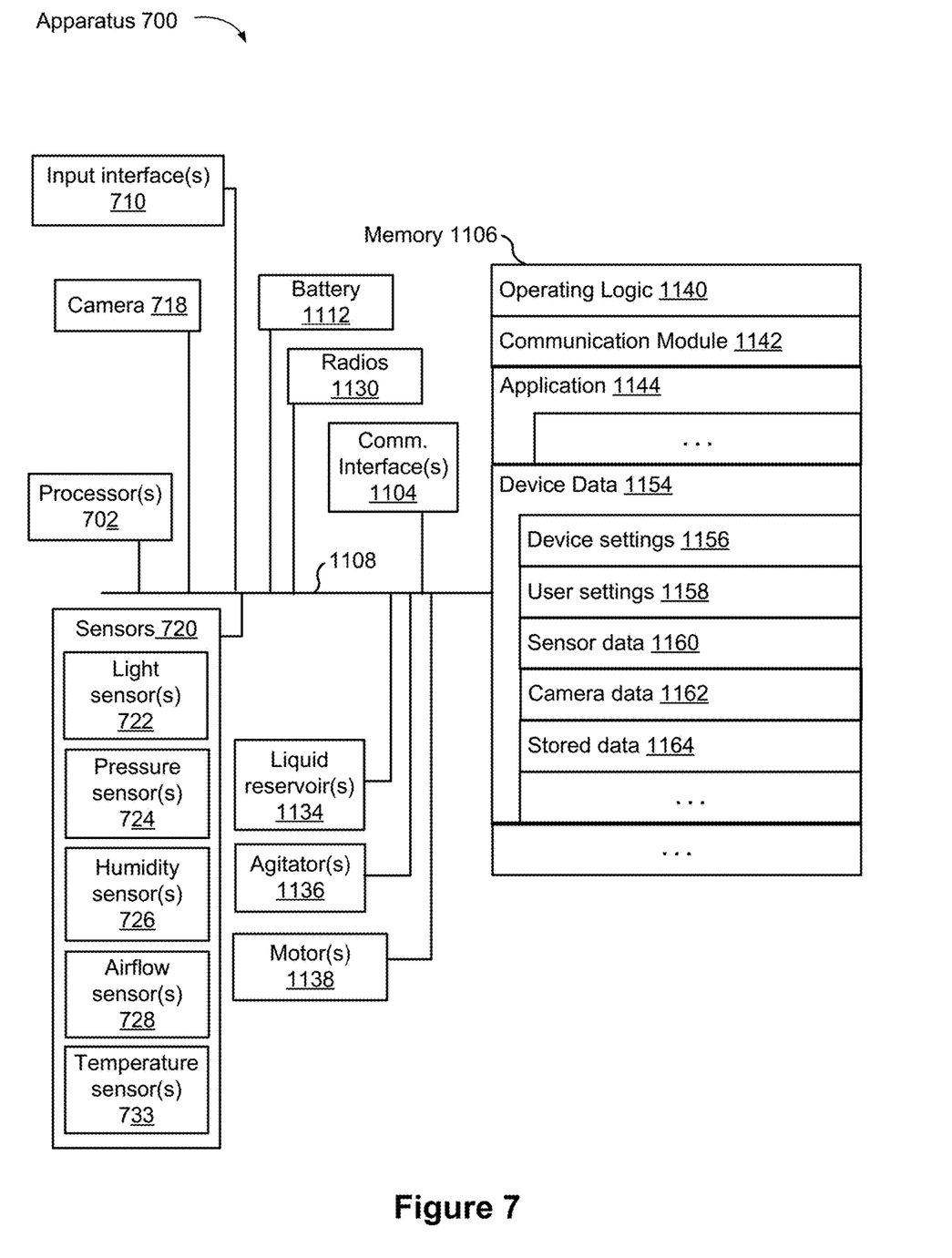
FIG. 7 is a block diagram of an electronic device that is configured to perform the methods described herein, in accordance with some embodiments.

FIG. 7 illustrates a block diagram of an apparatus 700 in accordance with some embodiments. The apparatus 700 includes a mobile robot 102 in some embodiments. In some embodiments, the apparatus 700 includes a server in communication with the mobile robot. The apparatus 700 is a representative of an electronic device that performs the process 600 in FIG. 6, in accordance with some embodiments.

The apparatus 700 includes one or more processor(s) 702, one or more communication interface(s) 704 (e.g., network interface(s)), memory 706, and one or more communication buses 708 for interconnecting these components (sometimes called a chipset).

In some embodiments, the apparatus 700 includes input interface(s) 710 that facilitates user input.

In some embodiments, the apparatus 700 includes one or more camera 718. In some embodiments, the camera 718 is configured to capture images in color. In some embodiments, the camera 718 is configured to capture images in black and white. In some embodiments, the camera 718 captures images with depth information.

In some embodiments, the apparatus 700 includes a battery 712. The apparatus 700 also includes sensors 720, such as light sensor(s) 722, pressure sensor(s) 724, humidity sensor(s) 726, airflow sensor(s) 728, and/or temperature sensor(s) 733 to facilitate tasks and operations of the mobile robot (e.g., cleaning, delivery, etc.). In some embodiments, the apparatus 700 also includes liquid reservoir(s) 734, agitator(s) 736, and/or motors 738 to execute a cleaning task (e.g., sweeping, scrubbing, mopping, etc.).

In some embodiments, the apparatus 700 includes radios 730. The radios 730 enable one or more communication networks, and allow the apparatus 700 to communicate with other devices, such as a docking station, a remote control device, a server, etc. In some implementations, the radios 730 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, Ultrawide Band (UWB), software defined radio (SDR) etc.) custom or standard wired protocols (e.g., Ethernet, HomePlug, etc.), and/or any other suitable communication protocol, including communication protocols not yet developed as of the filing date of this document.

The memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 706, optionally, includes one or more storage devices remotely located from one or more processor(s) 702. The memory 706, or alternatively the non-volatile memory within the memory 706, includes a non-transitory computer-readable storage medium. In some implementations, the memory 706, or the non-transitory computer-readable storage medium of the memory 706, stores the following programs, modules, and data structures, or a subset or superset thereof:

operating logic 740 including procedures for handling various basic system services and for performing hardware dependent tasks;

a communication module 742 (e.g., a radio communication module) for connecting to and communicating with other network devices (e.g., a local network, such as a router that provides Internet connectivity, networked storage devices, network routing devices, server systems, and/or other connected devices etc.) coupled to one or more communication networks via the communication interface(s) 704 (e.g., wired or wireless);

application 744 for performing tasks and self-locating, and for controlling one or more components of the apparatus 700 and/or other connected devices in accordance with preset instructions.

device data 754 for the apparatus 700, including but not limited to:
  device settings 756 for the apparatus 700, such as default options for performing tasks; and
  user settings 758 for performing tasks;
  sensor data 760 that are acquired (e.g., measured) from the sensors 720;
  camera data 762 that are acquired from the camera 718; and
  stored data 764. For example, in some embodiments, the stored data 764 include the semantic and feature maps of the environment, camera pose and map points of stored keyframes, etc. in accordance with some embodiments.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 706 stores a subset of the modules and data structures identified above. Furthermore, the memory 706 may store additional modules or data structures not described above. In some embodiments, a subset of the programs, modules, and/or data stored in the memory 706 are stored on and/or executed by a server system, and/or by a mobile robot. Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first sensor could be termed a second sensor, and, similarly, a second sensor could be termed a first sensor, without departing from the scope of the various described implementations. The first sensor and the second sensor are both sensors, but they are not the same type of sensor.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed.

Many modifications and variations are possible in view of the above teachings. The implementations were chosen in order to best explain the principles underlying the claims and their practical applications, to thereby enable others skilled in the art to best use the implementations with various modifications as are suited to the particular uses contemplated. The above clearly and completely describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

What is claimed is:

1. A method, comprising:
    capturing, by a camera device on a mobile robot moving in an environment, an image frame at a first location within a portion of the environment;
    in accordance with a determination that the image frame contains a first visual marker:
        determining a camera orientation angle from the camera device to a first anchor associated with the first visual marker based on the image frame;
        detecting, by a detector on the mobile robot, a first beacon signal comprising an ultra-wideband signal in a radio-frequency spectrum emitted by the first anchor;
        determining a distance between the mobile robot and the first anchor; and
        determining an orientation angle of the mobile robot based on the camera orientation angle, and the distance between the mobile robot and the first anchor including optimizing the orientation angle of the mobile robot by minimizing a reprojection error associated with the first visual marker and a second visual marker in the image frame, wherein the camera device is displaced from the detector on the mobile robot along a central axis of the mobile robot, the camera orientation angle is determined in a camera frame, and determining the camera orientation angle from the camera device to the first anchor comprises:
        determining a vector from a center of the camera device to a location of the first anchor in a world coordinate frame, and
        setting an angle made by the central axis of the mobile robot and a projection of the vector between a center of the camera device and the first anchor in a world coordinate frame as the camera orientation angle, wherein the anchor location is in the world coordinate frame.

2. The method of claim 1, further comprising:
    in accordance with a determination that the image frame does not contain the first visual marker:
        rotating the mobile robot at the first location so that the camera device captures a second image frame that includes the first visual marker.

3. The method of claim 1, further comprising:
    providing the first visual marker to the first anchor prior to capturing the image frame at the first location; and
    in accordance with a determination that one or more characteristics of the first beacon signal matches a predefined pattern:
        determining the camera orientation angle based on the image frame.

4. The method of claim 1, further comprising optimizing the determined orientation angle of the mobile robot iteratively using a learning gain.

5. The method of claim 1, wherein the camera orientation angle from the camera device to the first anchor is obtained in camera coordinates and the orientation angle of the mobile robot is determined in world coordinates.

6. A mobile robot, comprising:
    one or more processing units;
    memory;
    a camera device;
    a detector; and
    a plurality of programs stored in the memory that, when executed by the one or more processing units, cause the one or more processing units to perform operations comprising:
        capturing, by the camera device on the mobile robot moving in an environment, an image frame at a first location within a portion of the environment;
        in accordance with a determination that the image frame contains a first visual marker:
            determining a camera orientation angle from the camera device to a first anchor associated with the first visual marker based on the image frame;
            detecting, by a detector on the mobile robot, a first beacon signal comprising an ultra-wideband signal in a radio-frequency spectrum emitted by the first anchor;

determining a distance between the mobile robot and the first anchor; and determining an orientation angle of the mobile robot based on the camera orientation angle, and the distance between the mobile robot and the first anchor including optimizing the orientation angle of the mobile robot by minimizing a reprojection error associated with the first visual marker and a second visual marker in the image frame, wherein the camera device is displaced from the detector on the mobile robot along a central axis of the mobile robot, the camera orientation angle is determined in a camera frame, and determining the camera orientation angle from the camera device to the first anchor comprises:

determining a vector from a center of the camera device to a location of the first anchor in a world coordinate frame, and setting an angle made by the central axis of the mobile robot and a projection of the vector between a center of the camera device and the first anchor in a world coordinate frame as the camera orientation angle, wherein the anchor location is in the world coordinate frame.

7. The mobile robot of claim 6, wherein the operations include rotating the mobile robot at the first location so that the camera device captures a second image frame that includes the first visual marker in accordance with a determination that the image frame does not contain the first anchor.

8. The mobile robot of claim 6, wherein the one or more processing units determines that one or more characteristics of the first beacon signal matches a predefined pattern prior to determining the camera orientation angle based on the image frame.

9. The mobile robot of claim 6, wherein the operations further include optimizing the orientation angle of the mobile robot iteratively using a learning gain.

10. A non-transitory computer readable storage medium storing a plurality of programs for execution by an electronic device having one or more processing units, wherein the plurality of programs, when executed by the one or more processing units, causes the processing units to perform operations comprising:

capturing, by a camera device on a mobile robot moving in an environment, an image frame at a first location within a portion of the environment;

in accordance with a determination that the image frame contains a first visual marker:

determining a camera orientation angle from the camera device to a first anchor associated with the first visual marker based on the image frame;

detecting, by a detector on the mobile robot, a first beacon signal comprising an ultra-wideband signal in a radio-frequency spectrum emitted by the first anchor;

determining a distance between the mobile robot and the first anchor; and determining an orientation angle of the mobile robot based on the camera orientation angle, and the distance between the mobile robot and the first anchor including optimizing the orientation angle of the mobile robot by minimizing a reprojection error associated with the first visual marker and a second visual marker in the image frame, wherein the camera device is displaced from the detector on the mobile robot along a central axis of the mobile robot, the camera orientation angle is determined in a camera frame, and determining the camera orientation angle from the camera device to the first anchor comprises:

determining a vector from a center of the camera device to a location of the first anchor in a world coordinate frame, and setting an angle made by the central axis of the mobile robot and a projection of the vector between a center of the camera device and the first anchor in a world coordinate frame as the camera orientation angle, wherein the anchor location is in the world coordinate frame.

11. The non-transitory computer readable storage medium of claim 10, wherein the plurality of programs further causes the processing units to perform operations comprising:

in accordance with a determination that the image frame does not contain the first visual marker:

rotating the mobile robot at the first location so that the camera device captures a second image frame that includes the first visual marker.

12. The non-transitory computer readable storage medium of claim 10, wherein the plurality of programs further causes the processing units to perform operations comprising optimizing the determined orientation angle of the mobile robot iteratively using a learning gain.

13. The non-transitory computer readable storage medium of claim 10, wherein the camera orientation angle from the camera device to the first anchor is obtained in camera coordinates and the orientation angle of the mobile robot is determined in world coordinates.

14. The non-transitory computer readable storage medium of claim 13, wherein the plurality of programs further uses location information of the mobile robot and the first anchor to obtain the orientation angle of the mobile robot in world coordinates.

* * * * *